United States Patent
Ling

(10) Patent No.: US 10,994,797 B2
(45) Date of Patent: May 4, 2021

(54) STEERING DEVICE

(71) Applicant: Wonderides, Inc., Mercer Island, WA (US)

(72) Inventor: Tianfang Ling, Mercer Island, WA (US)

(73) Assignee: WONDERIDES, INC., Mercer Island, WA (US)

(*) Notice: Subject to any disclaimer, the term of this patent is extended or adjusted under 35 U.S.C. 154(b) by 449 days.

(21) Appl. No.: 15/990,040

(22) Filed: May 25, 2018

(65) Prior Publication Data

US 2019/0359279 A1 Nov. 28, 2019

(51) Int. Cl.
| | |
|---|---|
| B62K 5/08 | (2006.01) |
| B62D 9/00 | (2006.01) |
| B62K 21/12 | (2006.01) |
| B62K 21/18 | (2006.01) |
| B62D 7/20 | (2006.01) |

(52) U.S. Cl.
CPC ............ B62K 5/08 (2013.01); B62D 7/20 (2013.01); B62D 9/00 (2013.01); B62K 21/12 (2013.01); B62K 21/18 (2013.01)

(58) Field of Classification Search
CPC .......... B62K 5/08; B62K 21/12; B62K 21/18
See application file for complete search history.

(56) References Cited

U.S. PATENT DOCUMENTS

| | | | | |
|---|---|---|---|---|
| 4,881,755 A | * | 11/1989 | Vuagnat ............... | B62K 21/00 280/779 |
| 6,149,170 A | * | 11/2000 | Dotson .................. | A61H 3/04 280/267 |
| 6,161,860 A | * | 12/2000 | Comeau ................ | A61H 3/04 135/67 |
| 2008/0016980 A1 | * | 1/2008 | Gutierrez ............... | B62M 1/12 74/551.1 |
| 2012/0280467 A1 | * | 11/2012 | Walther ............ | G06Q 30/0641 280/263 |
| 2020/0255085 A1 | * | 8/2020 | Zhang ................... | C22C 38/04 |

FOREIGN PATENT DOCUMENTS

WO   WO-9925602 A1 * 5/1999 ............... B62K 5/10

* cited by examiner

*Primary Examiner* — Jacob D Knutson
(74) *Attorney, Agent, or Firm* — Hauptman Ham, LLP

(57) ABSTRACT

A steering device includes a handle unit; a steering connection piece; a joint connecting the handle unit to the steering connection piece; a steering connection rod movably connected to the steering connection piece; and a pair of steering rods each rotatably connected to the steering connection rod. In response to a rotation of the handle unit about a first rotational axis, the joint is configured to force the steering connection piece to rotate along with the handle unit about the first rotational axis to cause a shift of the steering connection rod along a first direction perpendicular to the first rotational axis, and the pair of steering rods is configured to rotate about second and third rotational axes, respectively, in response to the shift of the steering connection rod.

19 Claims, 5 Drawing Sheets

STEERING DEVICE

RELATED APPLICATIONS

The following US Applications are related to the instant application and are incorporated by reference herein:

US Patent Application titled "Ride-on Toy," application Ser. No. 15/985,138, filed on May 21, 2018, invented by Tianfang LING; and US Patent Application titled "One-Way Rotating Device," application Ser. No. 15/986,264, filed on May 22, 2018, invented by Tianfang LING.

TECHNICAL FIELD

The present disclosure relates to a steering device, and more particularly, to a steering device for a human power ride-on toy, biomimetic four-legged ride-on toy, and/or ride-on amusement facility.

BACKGROUND

When riders ride on ride-on toys, biomimetic four-legged ride-on toys, or ride-on amusement facilities, steering devices of these ride-on toys or amusement facilities according to other approaches may not be able to be flexibly steered. For example, when the rider on the ride-on toy according to other approaches moves up and down, the rider may not be able to freely steer the ride-on toy to turn clockwise or counter clockwise. Thus, the steering experience of such ride-on toys according to other approaches may be poor, and the riders may not have much fun when riding on such ride-on toys. Therefore, the inventor(s) propose(s) a steering device which in some embodiments provides a more flexible steering experience regardless of the up or down moving status of the rider of the ride-on toy. Such steering device can also let the rider simulate the image and feel close to the real "horse riding" experience, so that the rider can get fun from the riding.

BRIEF DESCRIPTION OF THE DRAWINGS

One or more embodiments are illustrated by way of example, and not by limitation, in the figures of the accompanying drawings, wherein elements having the same reference numeral designations represent like elements throughout.

DETAILED DESCRIPTION

Figure 1:
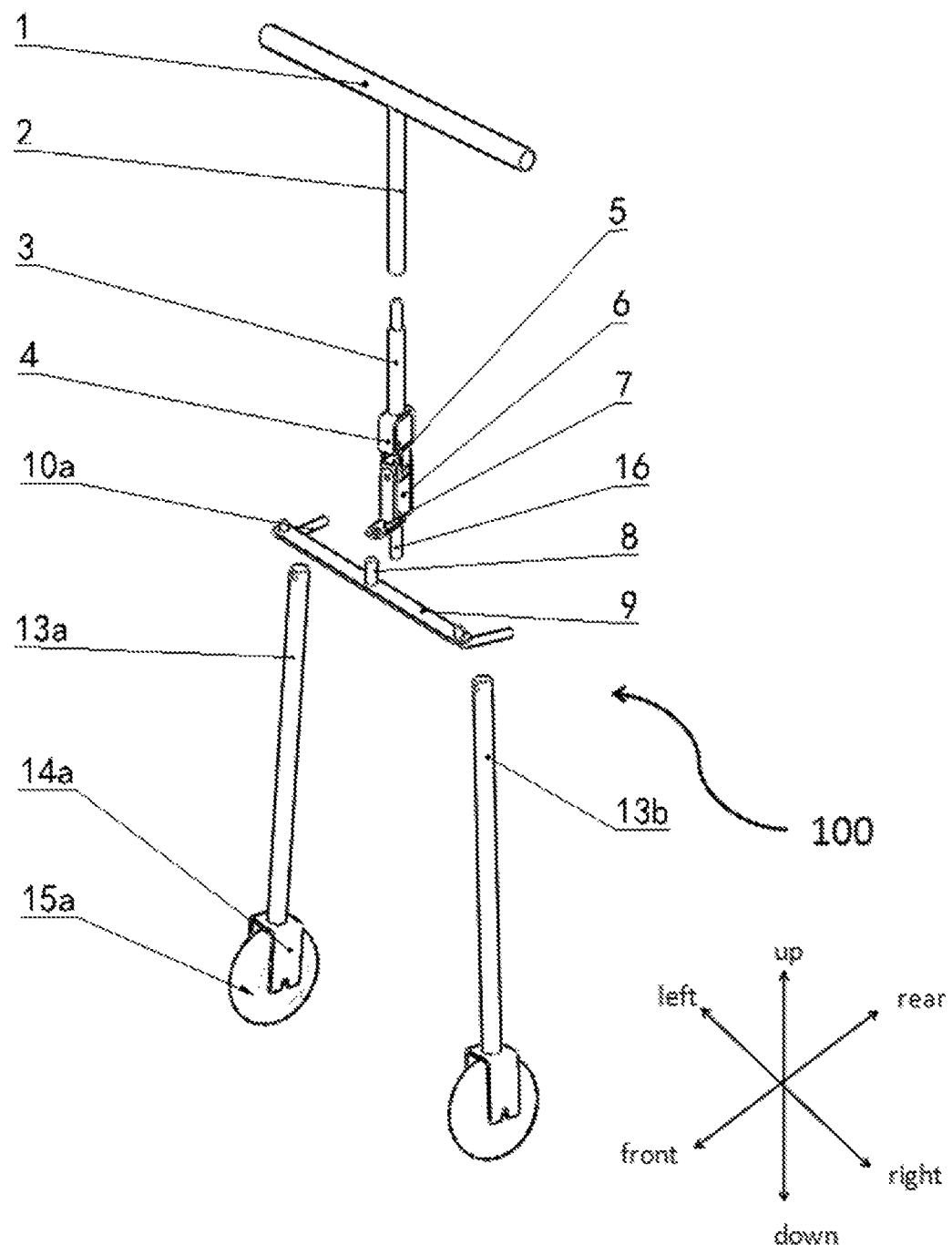
FIG. 1 is an exploded view of a steering device according to at least one embodiment.

The disclosure herein provides many different embodiments, or examples, for implementing different features of the disclosed subject matter. Specific examples of components and arrangements are described below to simplify the present disclosure. These are examples and are not intended to be limiting.

This description of the various embodiments is intended to be read in connection with the accompanying drawings, which are to be considered part of the entire written description. In the description, relative terms such as "before," "after," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the system be constructed or operated in a particular orientation. Terms concerning attachments, coupling and the like, such as "connected" and "interconnected," refer to a relationship wherein components are attached to one another either directly or indirectly through intervening components, unless expressly described otherwise. In the following description, "fixedly connected to each other" or "fixed to each other" means to connect two elements to each other such that the connected elements move together and do not move relative to each other.

According to the embodiment(s) described herein, it is possible to provide a steering device which can be easily steered in a flexible manner, e.g., when the steering device is installed on a ride-on toy. In any moving status of the ride-on toy, the steering device is rotatable clockwise or counterclockwise, and movable forward or backward. Therefore, when the rider steers the steering device, the rider can have a real "horse riding" experience. The steering device in some embodiments is used in a ride-on toy such as a ride-on toy as described in US patent application Ser. No. 15/985,138, titled "Ride-On Toy,", invented by Tianfang LING, which application is incorporated by reference herein.

According to the embodiment(s) shown in FIGS. 1-4, a steering device 100 has a front-rear direction, a left-right direction, and an up-down direction.

Figure 2:
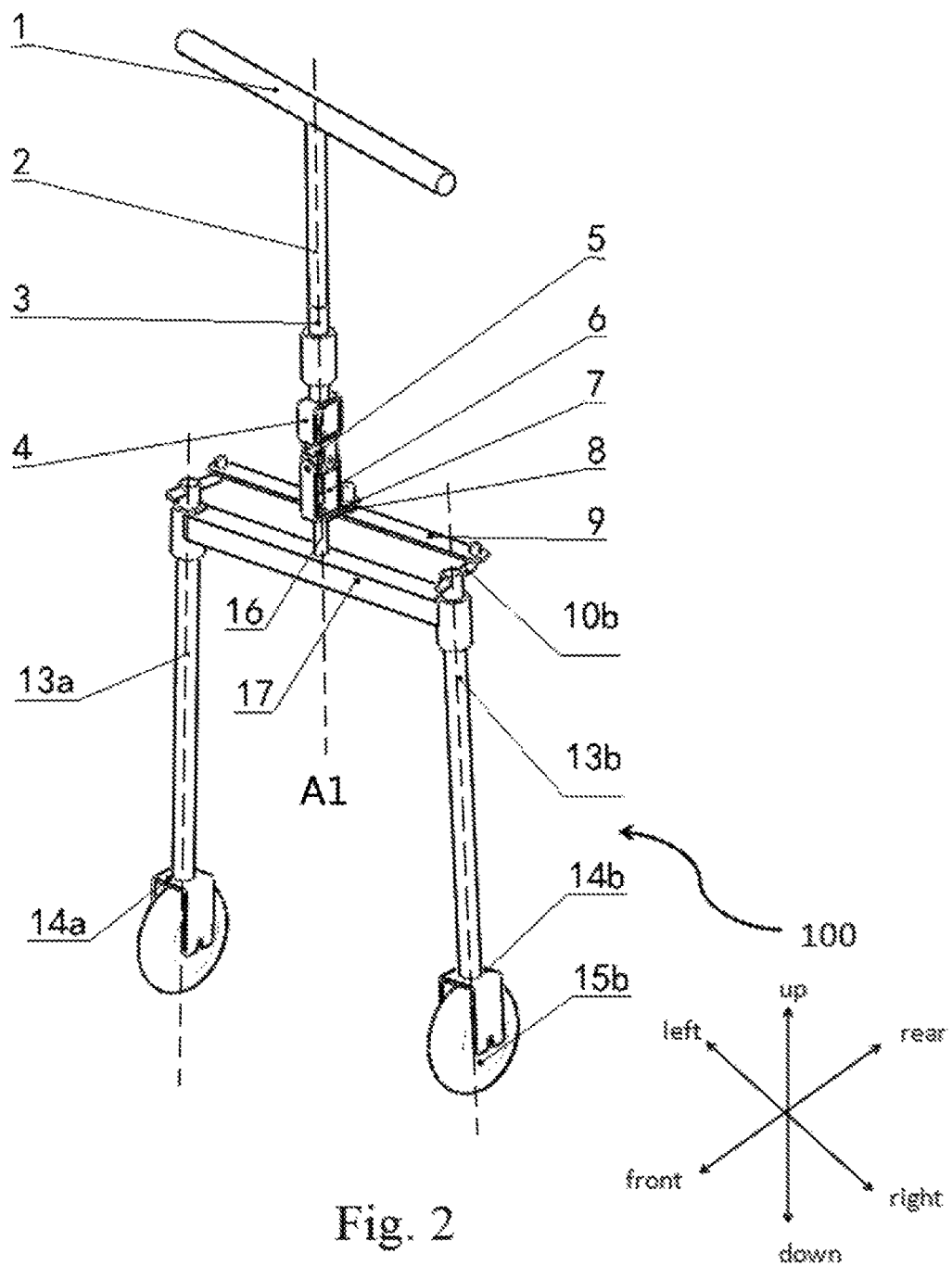
FIG. 2 is a perspective view of the steering device in an assembled state according to the at least one embodiment.

Referring to FIGS. 1-2, the steering device 100 includes a handle 1, a handle push-pull rod 2, a connection part 3, a cardan joint upper bracket 4, a cross block 5, a cardan joint lower bracket 6, a steering connection piece 7, an axis pin 8, a steering connection rod 9, a pair of steering axis pins 10a and 10b, a pair of steering rods 13a and 13b, a shaft 16, and a bracket beam 17.

The handle 1 is fixedly connected to the handle push-pull rod 2. The handle push-pull rod 2 has a longitudinal axis extending in the up-down direction and defining a first rotational axis A1 as shown in FIG. 2. The connection part 3 has a first end fixedly inserted into the handle push-pull rod 2, and a second end fixedly connected to the cardan joint upper bracket 4. In some embodiments, handle push-pull rod 2 and connection part 3 are integral into a one-piece body.

The cardan joint upper bracket 4, the cross block 5, and the cardan joint lower bracket 6 are rotatably connected to each other to form a cardan joint which will be described later with respect to FIG. 3. Further, the shaft 16 is fixedly connected to the cardan joint lower bracket 6 by the steering connection piece 7, and is rotatably connected to the bracket beam 17. The steering connection piece 7 fixedly connects the cardan joint lower bracket 6 to the steering connection rod 9.

The steering connection rod 9 is movably connected to the pair of steering rods 13 and the pair of steering axis pins 10a and 10b. Further, the steering rod 13a has a longitudinal axis defining a second rotational axis A2, and the steering rod 13b has a longitudinal axis defining a third rotational axis A3. The pair of steering rods 13a and 13b is configured to rotate about the second and third rotational axis A2 and A3, respectively. A pair of wheels 15a and 15b is mounted to the pair of steering rods 13a and 13b by a pair of wheel brackets 14a and 14b, respectively. In some embodiment, the wheels 15a and 15b are formed by assembling stop mechanisms, such as stop rings and/or ratchets, on double-way wheels or universal wheels (which would otherwise be rotatable in opposite directions) so as to cause the double-way wheels or universal wheels to rotate in one direction only. In some embodiments, at least one of the wheels 15a and 15b is a one-way rotating device as described in US patent application Ser. No. 15/986,264, titled "One-Way Rotating Device, ", invented by Tianfang LING, which application is incorporated by reference herein.

Figure 3:
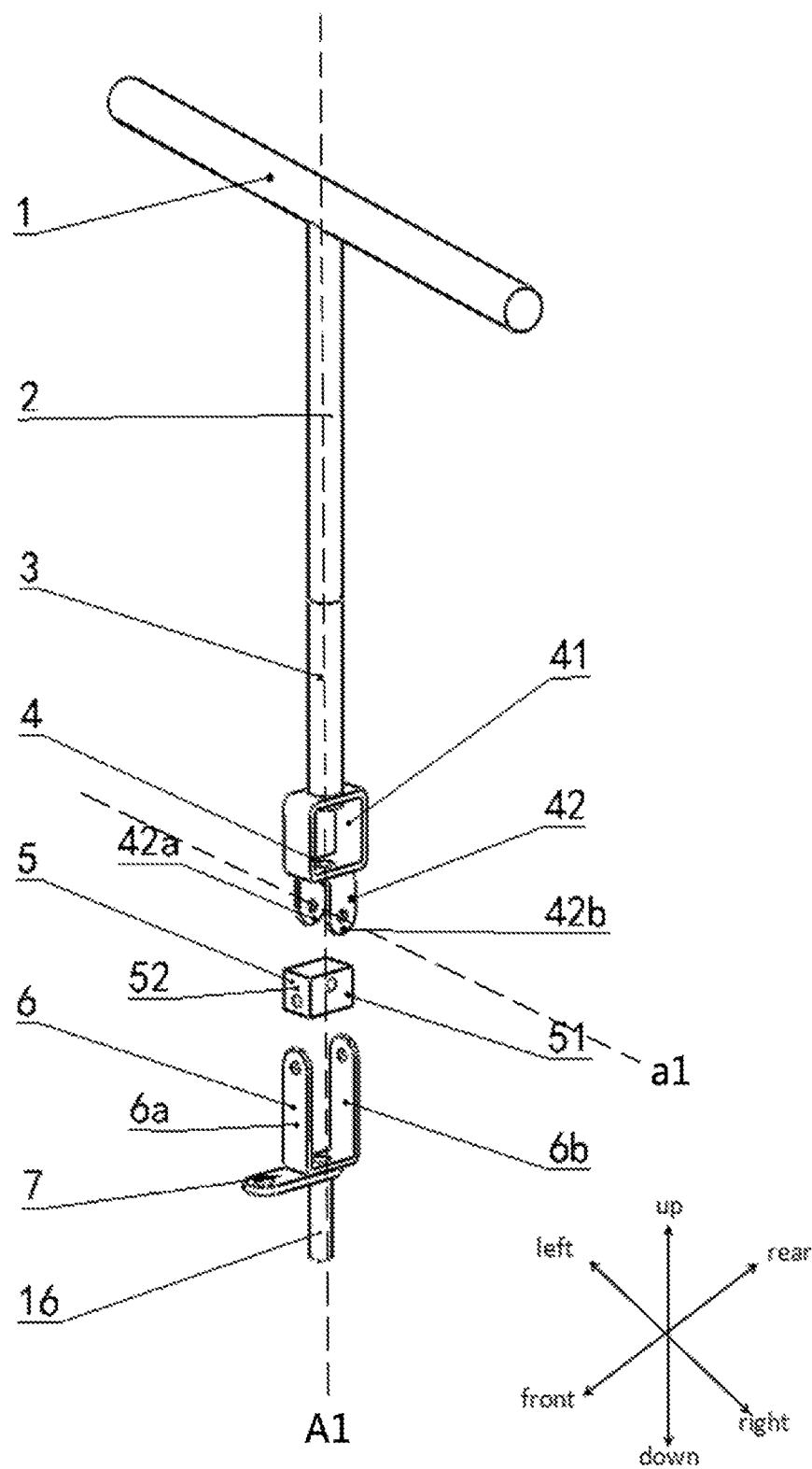
FIG. 3 is a partial exploded view of the steering device according to the at least one embodiment.

FIG. 3 is a partial exploded view of the steering device 100.

Referring to FIG. 3, the handle 1, the handle push-pull rod 2, the connection part 3, and the cardan joint upper bracket 4 are fixedly connected to each other to define a handle unit. The handle unit is rotatable clockwise or counterclockwise about the first rotational axis A1.

The handle 1 and the handle push-pull rod 2 are in a form of a T-shape where the handle 1 forms a horizontal section of the T-shape and the handle pull-pull rod 2 forms a vertical section of the T-shape. The connection part 3 has the first end fixedly inserted into the handle push-pull rod 2 and the second opposite end fixedly connected to the cardan joint upper bracket 4.

The cardan joint upper bracket assembly 4 includes an upper section 41 formed of a rectangular frame, and a lower section 42 formed of an inverted U-shape including a top wall and a pair of opposing side walls 42a and 42b. The upper section 41 and the lower section 42 are fixed to each other by connection means, e.g., screw and nut, welding, etc. The upper section 41 has an upper wall fixedly connected to the second end of the connection part 3, and a lower wall fixedly connected to the top wall of the U-shaped lower section 42. The pair of side walls 42a and 42b of the lower section 42 has a pair of through holes opposing to each other in the left-right direction perpendicular to the first rotational axis A1.

The cardan joint lower bracket 6 is formed of a U-shape including a bottom wall and a pair of opposing side walls 6a and 6b.

The cross block 5 has a cubic shape and rotatably connecting the cardan joint upper bracket 4 and the cardan joint lower bracket 6 to define a cardan joint. As shown in FIG. 3, the cross block 5 has a pair of first surfaces 51 opposing to each other in the left-right direction perpendicular to the first rotational axis A1, and a pair of second surfaces 52 opposing to each other in the front-rear direction perpendicular to the first rotational axis A1. The pair of first surfaces 51 of the cross block 5 is rotatably connected to the pair of side walls 42a and 42b of the lower section 42 of the cardan joint upper bracket, and the pair of second surfaces 52 is rotatably connected to the pair of side walls 6a and 6b of the lower bracket 6.

Further, the cardan joint upper bracket 4 is rotatable about an axis a1 perpendicular to the first rotational axis A1 and extending in the left-right direction when the handle 1 is pushed or pulled in the front-rear direction. The axis a1 is defined by the pair of through holes of the side walls 42a and 42b.

The cardan joint lower bracket 6 is fixedly connected to the steering connection piece 7 at a location on the first rotational axis A1. The steering connection piece 7 is an elongated piece extending in a longitudinal direction thereof beyond the side wall 6a of the lower bracket 6. The cardan joint lower bracket 6 and the steering connection piece 7 form an F shape.

The shaft 16 is fixedly connected to the cardan joint lower bracket 6 by the steering connection piece 7. Further, the shaft 16 is rotatably disposed in a middle portion of the bracket beam 17 so that the shaft 16 is rotatable along with the rotation of the handle 1 about the first rotational axis A1.

Figure 4:
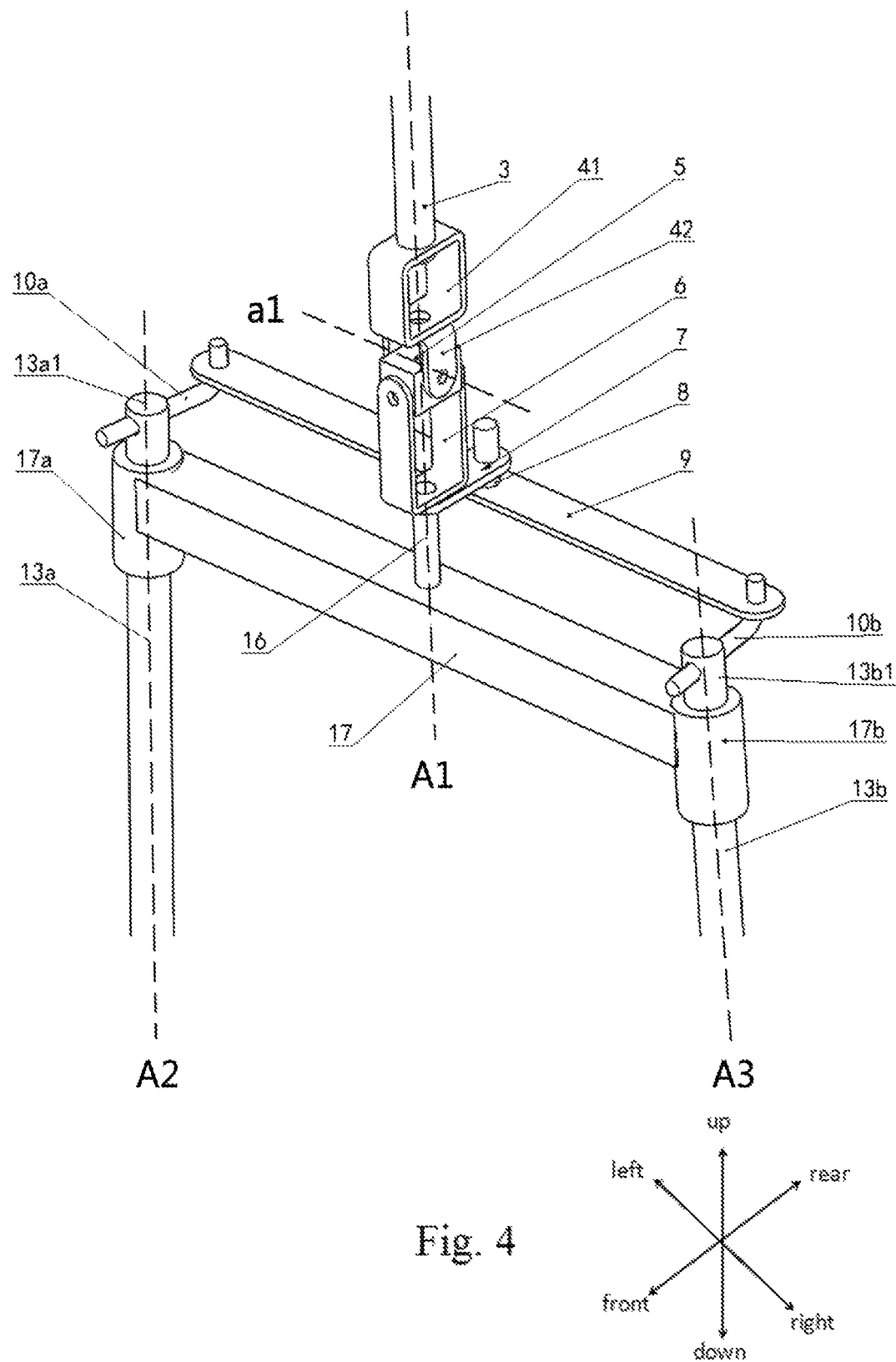
FIG. 4 is a partial perspective view of the steering device in an assembled state according to the at least one embodiment.

FIG. 4 is a partial view of the steering device 100 in an assembled state.

Referring to FIG. 4, the steering connection piece 7 has the first end fixedly connected to the lower bracket 6 and the second end movably connected to the axis pin 8 of the steering connection rod 9. The steering connection rod 9 includes two holes provided at two ends of the steering connection rod 9, respectively. The two ends of the steering connection rod 9 are moveably connected with the steering axis pin 10a and the steering axis pin 10b via the two holes, respectively. Each of the steering axis pins 10a and 10b is formed in an L-shape. The steering axis pin 10a extends through an upper end 13a1 of the steering rod 13a, and the steering axis pin 10b extends through an upper end 13b1 of the steering rod 13b.

The bracket beam 17 has two opposing ends provided with a pair of sleeves 17a and 17b. The pair of steering rods 13a and 13b extends through the pair of sleeves 17a and 17b, respectively. The steering rod 13a is configured to rotate about the second rotational axis A2 within the sleeve 17a, and the steering rod 13b is configured to rotate about the third rotational axis A3 within the sleeve 17b.

Referring to FIG. 4, the cardan joint upper bracket 4, the cross block 5, and the cardan joint lower bracket 6 are rotatably connected to each other to form the cardan joint connecting the handle unit to the steering connection piece 7. In response to a rotation of the handle unit about a first rotational axis A1, the joint is configured to force the steering connection piece 7 to rotate along with the handle unit about the first rotational axis A1 to cause a shift of the steering connection rod 9 along a first (left and right) direction perpendicular to the first rotational axis A1, and the pair of steering rods 13a and 13b is configured to rotate about second and third rotational axes A2 and A3, respectively, in response to the shift of the steering connection rod. In response to a rotation of the handle unit about another axis a1 perpendicular to the first rotational axis and extending in the left and right direction, the joint is configured to permit the handle unit to move relative to the steering connection piece in the rotation about the another axis.

According to FIGS. 1-4, the operation of the steering device 100 is described as follows.

The steering device 100 is configured to rotate the steering rods 13a and 13b about the second and third rotational axes A2 and A3 when the handle 1 is rotated about the first rotational axis A1.

In a first action (state) of the operation of the steering device 100, the handle 1 is rotated about the first rotational axis A1 in a clockwise direction, the handle push-pull rod 2, the connection part 3, the cardan joint upper bracket 4, the cross block 5, the cardan joint lower bracket 6, the steering connection piece 7, and the shaft 16 are rotated along with the handle 1 about the first rotational axis A1 in the clockwise direction, therefore the steering connection rod 9 is shifted, by the steering connection piece 7 movably connected at the axis pin 8, toward the right side (FIG. 4) in the left-right direction. The shift of the steering rod 9 causes the pair of steering rods 13a and 13b to rotate about the second and third rotational axes A2 and A3, respectively, in the clockwise direction. Therefore, the wheels 15*a* and 15*b*, which are connected to the steering rods 13*a* and 13*b*, respectively, are rotated in the clockwise direction. In other words, the rotation of the pair of steering rods 13*a* and 14*b* and/or the pair of wheels 15*a* and 15*b* are synchronized with the rotation of the handle 1.

In a second action (state) of the operation of the steering device, the handle 1 is rotated about the first rotational axis A1 in a counter clockwise direction, the handle push-pull rod 2, the connection part 3, the cardan joint upper bracket 4, the cross block 5, the cardan joint lower bracket 6, the steering connection piece 7, and the shaft 16 are rotated along with the handle 1 about the first rotational axis A1 in the counter clockwise direction, therefore the steering connection rod 9 is shifted, by the steering connection piece 7 movably connected at the axis pin 8, toward the left side (FIG. 4) in the left-right direction. The shift of the steering connection rod 9 causes the pair of steering rods 13*a* and 13*b* to rotate about the second and third rotational axes A2 and A3, respectively, in the counter clockwise direction. Further, the wheels 15*a* and 15*b*, which are mounted to the steering rods 13*a* and 13*b*, respectively, are rotated in the counter clockwise direction. In other words, the rotation of the pair of steering rods 13*a* and 14*b* and/or the pair of wheels 15*a* and 15*b* are synchronized with the rotation of the handle 1.

In the first and second actions (states) of the operation, the bracket beam 17 is configured to not rotate about the first rotational axis A1 in response to the rotation of the handle 1.

Figure 5:
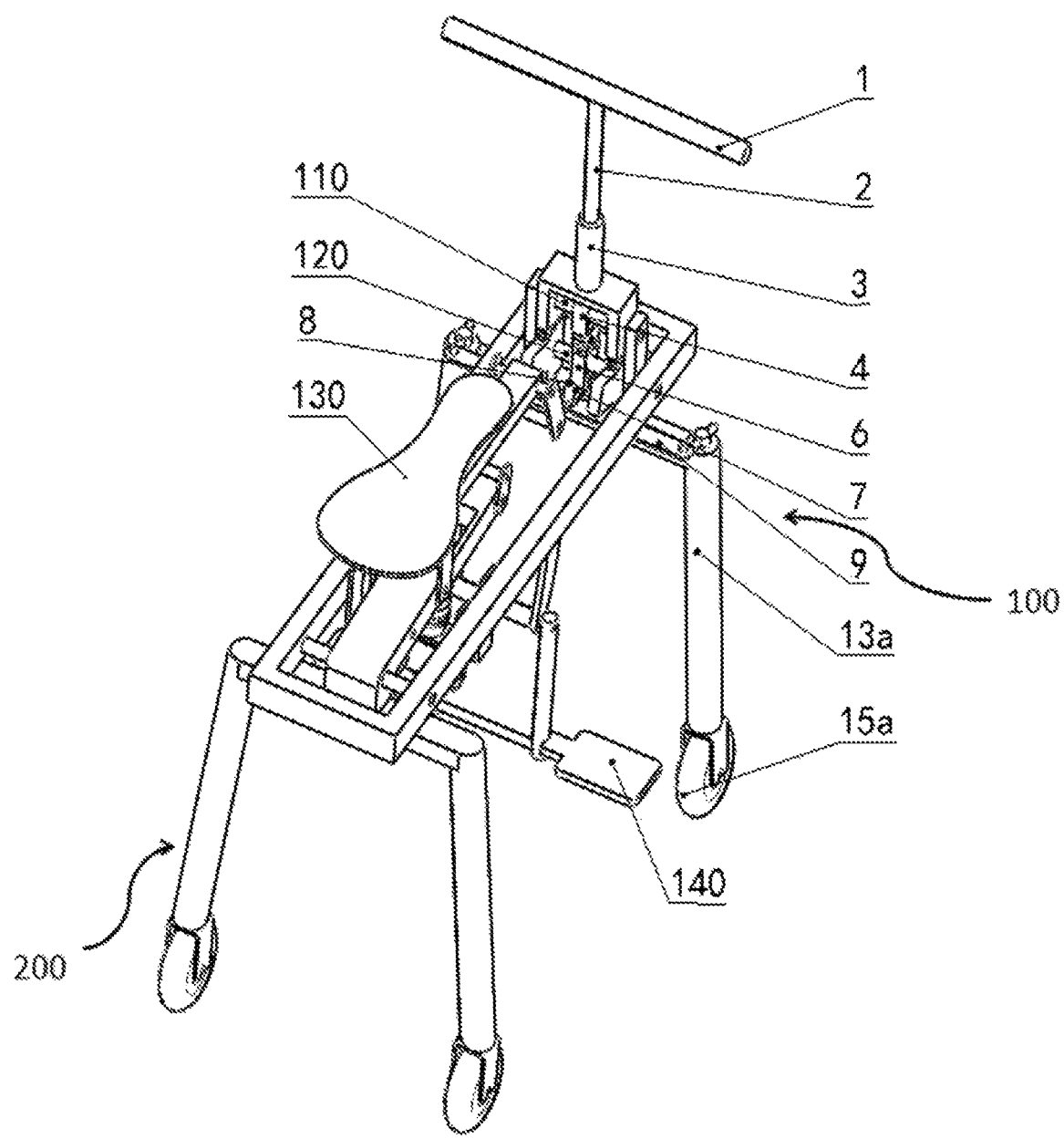
FIG. 5 is a perspective view of a ride-on toy installed with the steering device according to the at least one embodiment.

FIG. 5 a perspective view of a ride-on toy 200 installed with the steering device 100. In some embodiments, the ride-on toy 200 is a ride-on toy as described in US patent application Ser. No. 15/985,138, titled "Ride-On Toy,", invented by Tianfang LING, which application is incorporated by reference herein. In some embodiments, at least one of the wheels, including wheels 15*a*, 15*b*, in the ride-on toy 200 is a one-way rotating device as described in US patent application titled Ser. No. 15/986,264,"One-Way Rotating Device,", invented by Tianfang LING, which application is incorporated by reference herein.

Referring to FIG. 5, the ride-on toy 200 includes the steering device 100 and is configured to provide a real "horse riding" experience to the rider. In other words, the rider can steer the ride-on toy 200 to move forward or make a left or right turn, by operating the steering device 100, while moving on the ride-on toy in an up-and-down manner.

The steering device 100 is configured to form a "horse" neck portion, a "horse" chassis portion, and a "horse" steering leg portion. The "horse" neck portion is formed by the handle 1, the handle push-pull rod 2, the connection part 3, the cardan joint upper bracket 4, the cross block 5, the cardan joint lower bracket 6, the steering connection piece 7, and the shaft 16. The "horse" chassis portion is formed by the cross beam 17, the steering connection rod 9, and the steering axis pins 10*a* and 10*b*. The "horse" steering leg portion is formed by the steering rods 13*a* and 13*b*, the wheel brackets 14, and the wheels 15. Further, in the ride-on toy 200, a first horizontal bar 110 extends through the rectangular frame 41 of the cardan joint upper bracket 4, and a second horizontal bar 120 extends through the cardan joint lower bracket 6. The first and second horizontal bars 110 and 120 are disposed in parallel to each other to secure the cardan joint upper bracket 4 and the cardan joint lower bracket 6 in the "horse" neck portion of the ride-on toy 200, while still permitting the "horse" neck portion to move or rotate forward and rearward within a range limited, for example, by configurations, e.g., sizes, of the first horizontal bar 110 and the cardan joint upper bracket 4.

As shown in FIG. 5, the ride-on toy 200 further includes a saddle 130 and a pedal 140. The saddle 130 is configured to move downward when the rider sits on the saddle 130 while the rider's feet is relax and does not push the pedal 140 downward. The saddle 130 is configured to move upward when the rider applies a downward force on the pedal 140 by the rider's feet. In this manner, the rider of the ride-on toy 200 can be moved up and down. The operation of the steering device 100 does not interrupt the operation of the saddle 130 and the pedal 140; therefore, the ride-on toy 200 can be steered to turn left or right by operating the steering device 100 while the rider of the ride-on toy 200 is moved up and down.

Further, when the rider pushes or pulls the handle 1 in the front-rear direction, the upper bracket 4 is rotatable about the axis al (shown in FIG. 3) in the left-right direction. In this manner, the rider can operate the steering device 100 to move the "horse" neck portion forward and rearward to simulate a "horse" neck movement. In some embodiments, the steering device 100 is configured as a handle unit and a front leg unit of a ride-on toy as described in US patent application Ser. No. 15/985,138, titled "Ride-On Toy,", invented by Tianfang LING, which application is incorporated by reference herein.

Accordingly, the steering device 100 provides a flexible steering control of the ride-on toy 200 during an up and down movement of the rider of the ride-on toy 200, to simulate a real "horse riding" action.

In accordance with one embodiment, a steering device includes a handle unit; a steering connection piece; a joint connecting the handle unit to the steering connection piece; a steering connection rod movably connected to the steering connection piece through an axis pin 8; and a pair of steering rods each rotatably connected to the steering connection rod. In response to a rotation of the handle unit about a first rotational axis, the joint is configured to force the steering connection piece to rotate along with the handle unit about the first rotational axis to cause a shift of the steering connection rod along a first direction perpendicular to the first rotational axis, and the pair of steering rods is configured to rotate about second and third rotational axes, respectively, in response to the shift of the steering connection rod. In response to a rotation of the handle unit about another axis perpendicular to the first rotational axis, the joint is configured to permit the handle unit to move relative to the steering connection piece in the rotation about the another axis.

In accordance with another embodiment, a steering device includes a handle; a handle push-pull rod fixedly connected to the handle and having a longitudinal axis defining a first rotational axis; an upper bracket fixedly connected to the handle push-pull rod; a cross block; a lower bracket movably connected to the upper bracket by the cross block; a steering connection piece fixedly connected to the lower bracket; a shaft fixedly connected to the lower bracket and the steering connection piece; a steering connection rod elongated in a first direction perpendicular to the first rotational axis and movably connected to the steering connection piece; a cross beam elongated in the first direction and in which the shaft is rotatably disposed in the cross beam; and a pair of steering rods rotatably connected to the cross beam and to the steering connection rod, the pair of steering rods being configured to rotate about second and third rotational axis, respectively.

In accordance with another embodiment, a ride-on toy includes a neck portion including a handle unit, a steering connection piece, and a joint connecting the handle unit to the steering connection piece; a chassis portion including a steering connection rod movably connected to the steering connection piece through an axis pin 8; and a steering leg portion including a pair of steering rods rotatably connected to the cross beam and the steering connection rod. In response to a rotation of the handle unit about a first rotational axis, the joint is configured to force the steering connection piece to rotate along with the handle unit about the first rotational axis to cause a shift of the steering connection rod along a first direction perpendicular to the first rotational axis, and the pair of steering rods is configured to rotate about second and third rotational axes, respectively, in response to the shift of the steering connection rod. In response to a rotation of the handle unit about another axis perpendicular to the first rotational axis, the joint is configured to permit the handle unit to move relative to the steering connection piece in the rotation about the another axis.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A steering device, comprising:
    a handle unit;
    a steering connection piece;
    a joint connecting the handle unit to the steering connection piece;
    a steering connection rod movably connected to the steering connection piece; and
    a pair of steering rods each rotatably connected to the steering connection rod,
    wherein
    in response to a rotation of the handle unit about a first rotational axis,
        the joint is configured to force the steering connection piece to rotate along with the handle unit about the first rotational axis to cause a shift of the steering connection rod along a first direction perpendicular to the first rotational axis, and
        the pair of steering rods is configured to rotate about second and third rotational axes, respectively, in response to the shift of the steering connection rod,
    in response to a rotation of the handle unit about another axis perpendicular to the first rotational axis, the joint is configured to permit the handle unit to move relative to the steering connection piece in the rotation about said another axis
    the steering device further includes a bracket beam elongated in the first direction and in parallel with the steering connection rod,
    the bracket beam includes a pair of opposing sleeves in the first direction, and
    the pair of steering rods is rotatably inserted into the pair of opposing sleeves, respectively.
2. The steering device according to claim 1, wherein the steering connection rod has a pair of steering axis pins opposite to each other in the first direction, and the pair of steering axis pins is movably connected to the pair of steering rods, respectively.
3. The steering device according to claim 2, wherein each of the steering rods is movably connected to the steering axis pins, and
    when the steering connection rod is shifted to in the first direction, each of the steering axis pins is configured to rotate about the second or third rotational axis to cause the corresponding steering rod to rotate about the second or third rotational axis.
4. The steering device according to claim 1, wherein the steering connection rod has an axis pin movably connected to the steering connection piece.
5. The steering device according to claim 1, further comprising:
    a shaft rotatably disposed in the bracket beam and fixedly connected to the joint by the steering connection piece, wherein
    the handle unit is configured to rotate about the first rotational axis to cause the joint, the steering connection piece, and the shaft to rotate about the first rotational axis while maintaining the bracket beam not rotated.
6. The steering device according to claim 5, wherein the joint includes an upper bracket, a lower bracket, and a block,
    the upper bracket is movably connected with the lower bracket via the block,
    the upper bracket includes a first section formed of a rectangular frame, and a second section fixedly connected to the first section and formed of an inverted U-shape, and
    the lower bracket is formed of a U-shape fixedly connected to the steering connection piece.
7. The steering device according to claim 6, wherein the upper bracket is configured to rotate about said another axis perpendicular to the first rotational axis when the handle unit is moved relative to the steering connection piece in the rotation about said another axis.
8. The steering device according to claim 1, wherein the handle unit includes a handle, and a handle push-pull rod having a longitudinal axis defining the first rotational axis.
9. The steering device according to claim 1, further comprising a pair of wheels mounted to the pair of steering rods, respectively, wherein
    each of the pair of wheels is rotatable along with the rotation of the corresponding steering rod.
10. The steering device according to claim 1, wherein when the handle unit is rotated about the first rotational axis in a clockwise direction,
        the steering connection piece is configured to rotate along with the handle unit about the first rotational axis in the clockwise direction, and
        the steering connection rod is configured to shift, by the steering connection piece, toward a first side in the first direction, wherein the shift of the steering connection rod is configured to cause the pair of steering rods to rotate about the second and third rotational axes, respectively, in the clockwise direction, and
    when the handle unit is rotated about the first rotational axis in a counter clockwise direction,
        the steering connection piece is configured to rotate along with the handle unit about the first rotational axis in the counter clockwise direction, and
        the steering connection rod is configured to shift, by the steering connection piece, toward an opposite, second side in the first direction, wherein the shift of the steering connection rod is configured to cause the pair of steering rods to rotate about the second and third rotational axes, respectively, in the counter clockwise direction.

11. A steering device, comprising:
a handle;
a handle push-pull rod fixedly connected to the handle and having a longitudinal axis defining a first rotational axis;
an upper bracket fixedly connected to the handle push-pull rod;
a cross block;
a lower bracket movably connected to the upper bracket by the cross block;
a steering connection piece fixedly connected to the lower bracket;
a shaft fixedly connected to the lower bracket and the steering connection piece;
a steering connection rod elongated in a first direction perpendicular to the first rotational axis and movably connected to the steering connection piece;
a cross beam elongated in the first direction and in which the shaft is rotatably disposed in the cross beam; and
a pair of steering rods rotatably connected to the cross beam and to the steering connection rod, the pair of steering rods being configured to rotate about second and third rotational axis, respectively.

12. The steering device according to claim 11, wherein
the steering connection rod has a pair of steering axis pins opposite to each other in the first direction, and
the pair of steering axis pins is movably connected to the pair of steering rods, respectively.

13. The steering device according to claim 12, wherein
each of the steering rods is movably connected to the steering axis pins, and
when the steering connection rod is shifted to in the first direction, each of the steering axis pins is configured to rotate about the second or third rotational axis to cause the corresponding steering rod to rotate about the second or third rotational axis.

14. The steering device according to claim 11, wherein the steering connection rod has an axis pin movably connected to the steering connection piece.

15. The steering device according to claim 11, wherein
the cross beam is disposed in parallel with the steering connection rod,
the cross beam includes a pair of opposing sleeves in the first direction, and
the pair of steering rods is rotatably inserted into the pair of opposing sleeves, respectively.

16. The steering device according to claim 15, wherein
the upper bracket includes a first section formed of a rectangular frame, and a second section fixedly connected to the first section and formed of an inverted U-shape, and
the lower bracket is formed of a U-shape fixedly connected to the steering connection piece.

17. The steering device according to claim 16, wherein
the upper bracket is configured to rotate about another axis perpendicular to the first rotational axis when the handle is moved relative to the steering connection piece in rotation about said another axis.

18. The steering device according to claim 11, further comprising a pair of wheels mounted to the pair of steering rods, respectively, wherein
each of the pair of wheels is configured to rotate along with the rotation of the corresponding steering rod.

19. A ride-on toy, comprising:
a neck portion including a handle unit, a steering connection piece, and a joint connecting the handle unit to the steering connection piece;
a chassis portion including a steering connection rod movably connected to the steering connection piece; and
a steering leg portion including a beam and a pair of steering rods rotatably connected to the beam and the steering connection rod,
wherein
in response to a rotation of the handle unit about a first rotational axis,
the joint is configured to force the steering connection piece to rotate along with the handle unit about the first rotational axis to cause a shift of the steering connection rod along a first direction perpendicular to the first rotational axis, and
the pair of steering rods is configured to rotate about second and third rotational axes, respectively, in response to the shift of the steering connection rod,
in response to a rotation of the handle unit about another axis perpendicular to the first rotational axis, the joint is configured to permit the handle unit to move relative to the steering connection piece in the rotation about said another axis
the beam is elongated in the first direction and in parallel with the steering connection rod,
the beam includes a pair of opposing sleeves in the first direction, and
the pair of steering rods is rotatably inserted into the pair of opposing sleeves, respectively.

* * * * *